(12) United States Patent
Sahasrabudhe et al.

(10) Patent No.: US 12,051,939 B2
(45) Date of Patent: Jul. 30, 2024

(54) BACK-UP POWER SUPPLY GENERATION TECHNIQUE FOR CLOCKS AND CRITICAL DATA SAVES FOR CONTROLLERS

(71) Applicant: Cummins Inc., Columbus, IN (US)

(72) Inventors: Shekhar Ganesh Sahasrabudhe, Pune (IN); Dhairyashil Hemantkumar Patil, Pune (IN); Abhik Giri, Pune (IN)

(73) Assignee: Cummins Inc., Columbus, IN (US)

( * ) Notice: Subject to any disclaimer, the term of this patent is extended or adjusted under 35 U.S.C. 154(b) by 232 days.

(21) Appl. No.: 17/631,290

(22) PCT Filed: Jul. 30, 2019

(86) PCT No.: PCT/US2019/044130
§ 371 (c)(1),
(2) Date: Jan. 28, 2022

(87) PCT Pub. No.: WO2021/021131
PCT Pub. Date: Feb. 4, 2021

(65) Prior Publication Data
US 2022/0320892 A1 Oct. 6, 2022

(51) Int. Cl.
*H02J 9/06* (2006.01)
*G06F 1/14* (2006.01)
(Continued)

(52) U.S. Cl.
CPC ............ *H02J 9/061* (2013.01); *G06F 1/14* (2013.01); *G06F 1/263* (2013.01); *G06F 1/30* (2013.01);
(Continued)

(58) Field of Classification Search
CPC ...... H02J 9/061; H02J 2310/20; H02J 7/0063; G06F 1/30; G06F 1/263; G06F 1/14
See application file for complete search history.

(56) References Cited

U.S. PATENT DOCUMENTS 4,644,498 A 2/1987 Bedard et al.
5,377,206 A 12/1994 Smith
(Continued)

FOREIGN PATENT DOCUMENTS

| CN | 203368139 U | 12/2013 |
|---|---|---|
| CN | 107086659 A | 8/2017 |
| JP | 2008-256574 A | 10/2008 |

OTHER PUBLICATIONS

EPO Extended Search Report and Opinion for Application No. EP19939244.0 mailing date Mar. 13, 2023, 9 pages.
(Continued)

*Primary Examiner* — Jared Fureman
*Assistant Examiner* — Esayas G Yeshaw
(74) *Attorney, Agent, or Firm* — FOLEY & LARDNER LLP

(57) ABSTRACT

A controller includes a microcontroller and a control circuit. The control circuit includes circuitry structured to sense an alternating current (AC) from a current transformer coupled to the controller, convert the AC to direct current (rectified output DC), charge a capacitor to a first predetermined voltage level using the rectified output DC of the current transformer, and switch from a primary power supply for the microcontroller to a secondary power supply that includes the capacitor. The control circuit includes circuitry structured to cause the capacitor of the secondary power supply to provide power, at a second voltage level, to a clock coupled to the microcontroller.

20 Claims, 6 Drawing Sheets

(51) Int. Cl.
  *G06F 1/26* (2006.01)
  *G06F 1/30* (2006.01)
  *H02J 7/00* (2006.01)
(52) U.S. Cl.
  CPC ......... *H02J 7/0063* (2013.01); *H02J 2310/20* (2020.01)

(56) References Cited

U.S. PATENT DOCUMENTS

| | | | |
|---|---|---|---|
| 5,994,892 A | 11/1999 | Turino et al. | |
| 6,016,045 A | 1/2000 | Thomas et al. | |
| 6,040,640 A | 3/2000 | Gehre et al. | |
| 6,114,842 A | 9/2000 | Simpson et al. | |
| 6,121,694 A | 9/2000 | Thereze | |
| 6,184,593 B1 * | 2/2001 | Jungreis | H02J 9/066 307/64 |
| 8,001,419 B2 | 8/2011 | Killian et al. | |
| 8,217,697 B2 | 7/2012 | Satterfield | |
| 9,182,429 B2 | 11/2015 | Saxby et al. | |
| 9,276,515 B2 | 3/2016 | Yeh | |
| 9,466,417 B2 | 10/2016 | Jefferies et al. | |
| 9,678,113 B2 | 6/2017 | Shamir et al. | |
| 2005/0063121 A1 | 3/2005 | Jordan | |
| 2012/0218793 A1 | 8/2012 | Springett et al. | |
| 2013/0035802 A1 | 2/2013 | Khaitan et al. | |
| 2016/0204484 A1 | 7/2016 | Haensgen et al. | |
| 2016/0341773 A1 | 11/2016 | Reineccius et al. | |
| 2017/0066531 A1 | 3/2017 | Mcadoo | |
| 2017/0098956 A1 | 4/2017 | Sarti | |
| 2017/0179732 A1 | 6/2017 | Hoeppner et al. | |
| 2017/0271915 A1 | 9/2017 | Quinn et al. | |
| 2018/0054064 A1 * | 2/2018 | Narla | H02J 9/061 |
| 2018/0054070 A1 | 2/2018 | Krishnamoorthy et al. | |
| 2018/0287482 A1 * | 10/2018 | Schult | H02M 1/14 |
| 2019/0386504 A1 * | 12/2019 | Yao | H02J 13/00026 |

OTHER PUBLICATIONS

Office Action for CN Appl. No. 201980099056.8, dated May 19, 2023 (with English translation, 13 pages).
Foreign Action other than Search Report on IN 202247005355 DTD May 31, 2022.
International Search Report and Written Opinion for International Patent Application No. PCT/US19/44130; dated Oct. 22, 2019; 10 pages.
PCT International Search Report and Written Opinion for International Application No. PCT/US2019/044130 mailing date Oct. 22, 2019, 10 pages.

* cited by examiner

BACK-UP POWER SUPPLY GENERATION TECHNIQUE FOR CLOCKS AND CRITICAL DATA SAVES FOR CONTROLLERS

TECHNICAL FIELD

The present disclosure relates to back-up power systems. More particularly, the present disclosure relates to back-up power supply generation for a real-time clock and microcontroller functions, including critical data saves, for controllers in back-up power systems, such as generator sets) "gensets" (, generator systems and/or automatic power transfer systems where continuous load current measurement is performed.

BACKGROUND

A genset is used to provide back-up power—for example, in areas where power outages are expected to occur and/or in mission-critical systems (i.e., systems that require substantially zero downtime) to minimize system downtime. A genset can include an engine and a generator and can be managed via a controller. Modern electronic systems, such as systems electronically coupled to or included in gensets, are provided with a clock (for example, a real-time clock built into a controller system) that keeps track of time even when the electronic system itself is turned off. Typically, clocks run on a special battery that is not connected to the primary power supply for the controller of the electronic system. When the supply of power is interrupted, such as when the main (primary) battery is in a disconnected state or is not operational, critical data can be lost. It is therefore necessary to continue to supply back-up power to various components of the electronic system, such as the clock, any microcontrollers, RAM memory blocks, ROM memory blocks, etc. In such cases, a back-up source of power is commonly used. The provision of back-up power in electronic systems is typically accomplished using a back-up battery. Back-up batteries have a finite capacity and therefore provide back-up power for a limited period of time, rather than providing ongoing power. Additionally, back-up batteries may need to be taken offline for maintenance or replacement.

SUMMARY

One example embodiment relates to an apparatus comprising a controller. The controller includes a microcontroller and circuitry. The circuitry is structured to sense an alternating current (AC) from a current transformer coupled to the controller. The circuitry is structured to convert the AC, sensed from the current transformer, to direct current (rectified output DC). The circuitry is structured to charge a capacitor to a first predetermined voltage level using the rectified output DC of the current transformer. The capacitor is coupled to the controller and to a secondary power supply structured to provide power to the microcontroller when a primary power supply ceases providing power. The circuitry is structured to, responsive to determining that the primary power supply, structured to provide power to the microcontroller, ceases providing power, and responsive to switching from the primary power supply to the secondary power supply, activate the secondary power supply. The circuitry is structured to cause the capacitor of the secondary power supply to provide power to the microcontroller at a second predetermined voltage level, different from the first predetermined voltage level. The circuitry is structured to cause the capacitor of the secondary power supply to provide power to a clock coupled to the microcontroller.

In some embodiments, the clock is a real-time clock (RTC).

In some embodiments, the controller of the apparatus includes a voltage switching circuit, and the voltage switching circuit includes hardware circuitry structured to cause the controller to set the second predetermined voltage level. In some embodiments, the voltage switching circuit further includes hardware circuitry structured to cause a voltage regulator, coupled to the microcontroller, to maintain substantially constant voltage level within 1% of the second predetermined voltage level. In some embodiments, the first predetermined voltage level is 5V. In some embodiments, the second predetermined voltage level is 3.3V.

In some embodiments, the controller of the apparatus is structured to control operations of an electronic component coupled to a genset, and the controller is one of an automatic transfer switch controller, a load management controller, and an AC distribution controller.

Another example embodiment relates to a system, such as a control system for an electronic component coupled to a genset. The system includes a microcontroller associated with a controller of the control system, the controller comprising a control circuit. The microcontroller comprises a clock. In some embodiments, the clock is a real-time clock. The system includes a primary power supply for the microcontroller and a secondary power supply for the microcontroller, the secondary power supply being coupled to a current transformer and including a capacitor. The control circuit is structured to sense an alternating current (AC) from the current transformer. The control circuit is structured to convert the AC, sensed from the current transformer, to direct current (rectified output DC). The control circuit is structured to charge the capacitor to a first predetermined voltage level using the rectified output DC of the current transformer. The control circuit is structured to, responsive to determining that the primary power supply ceases providing power and responsive to switching from the primary power supply to the secondary power supply, activate the secondary power supply. The control circuit is structured to cause the capacitor of the secondary power supply to provide power to the microcontroller at a second predetermined voltage level, different from the first predetermined voltage level. The control circuit is structured to cause the capacitor of the secondary power supply to provide power to the clock at the second predetermined voltage level.

In some embodiments, at least one of the first predetermined voltage level and the second predetermined voltage level are set by configuring hardware circuitry.

In some embodiments, the controller is structured to cause a voltage regulator, coupled to the controller, to maintain a constant voltage level within 1% of the second predetermined voltage level. In some embodiments, the first predetermined voltage level is 5V and the second predetermined voltage level is 3.3V. In some embodiments, the controller is one of an automatic transfer switch controller, a load management controller, and an AC distribution controller.

Another example embodiment relates to a method for back-up power supply generation for a microcontroller associated with an electronic component coupled to a genset. The method includes sensing, by a control circuit of a controller, an alternating current (AC) from a current transformer. The method includes converting the AC, sensed from the current transformer, to direct current (rectified output DC). The method includes charging a capacitor to a first predetermined voltage level using the rectified output DC of the current transformer, wherein the capacitor is coupled to a secondary power supply structured to provide power, when a primary power supply ceases providing power, to the microcontroller. The method includes, responsive to determining that the primary power supply, structured to provide power to the microcontroller, ceases providing power, switching from the primary power supply to the secondary power supply, activating the secondary power supply, and causing the capacitor of the secondary power supply to provide power to the microcontroller at a second predetermined voltage level, different from the first predetermined voltage level.

In some embodiments, the microcontroller comprises a real-time clock, and the method further includes causing, by the control circuit, the secondary power supply to provide power to the real-time clock.

In some embodiments, causing the capacitor of the secondary power supply to provide power to the microcontroller at the second predetermined voltage level further includes reaching, by a voltage switching circuit of the controller, a value within 1% of the second predetermined voltage level.

In some embodiments, the voltage switching circuit of the controller is coupled to a voltage regulator. The method further includes causing, by the voltage switching circuit, the voltage regulator to maintain a substantially constant voltage level corresponding to the second predetermined voltage level. In some embodiments, the first predetermined voltage level is 5V. In some embodiments, the second predetermined voltage level is 3.3V.

In some embodiments, a rate of flow of the AC from the current transformer is between, and inclusive of, 100 milliamps and 500 milliamps. In some embodiments, the controller is structured to control operations of the electronic component coupled to the genset, and the controller is one of an automatic transfer switch controller, a load management controller, and an AC distribution controller.

These and other features, together with the organization and manner of operation thereof, will become apparent from the following detailed description when taken in conjunction with the accompanying drawings.

DETAILED DESCRIPTION

Following below are more detailed descriptions of various concepts related to, and implementations of, methods, apparatuses, and systems for back-up power supply generation for clocks and critical data saves for microcontrollers. The various concepts introduced above and discussed in greater detail below may be implemented in any number of ways, as the concepts described are not limited to any particular manner of implementation. Examples of specific implementations and applications are provided primarily for illustrative purposes.

Referring to the Figures generally, the various embodiments disclosed herein relate to power systems, apparatuses, and methods, and more specifically, to systems and methods for back-up power supply generation for a clock that may be used for critical data saves for controllers. In a scenario where a primary controller battery is disconnected due to servicing (or, any other reason), the clock is usually powered either from an auxiliary battery (e.g., 3.3V) or from a super capacitor, which can store the charge from primary controller battery for a certain period of time. However, these approaches are not optimal for on-going provision of power. The Applicant has therefore developed a solution, disclosed herein, whereby a controller (such as a controller included in or coupled to components of a genset) remains powered through energy harvesting using a current transformer when the primary battery that powers the controller is not operational.

Figure 1:
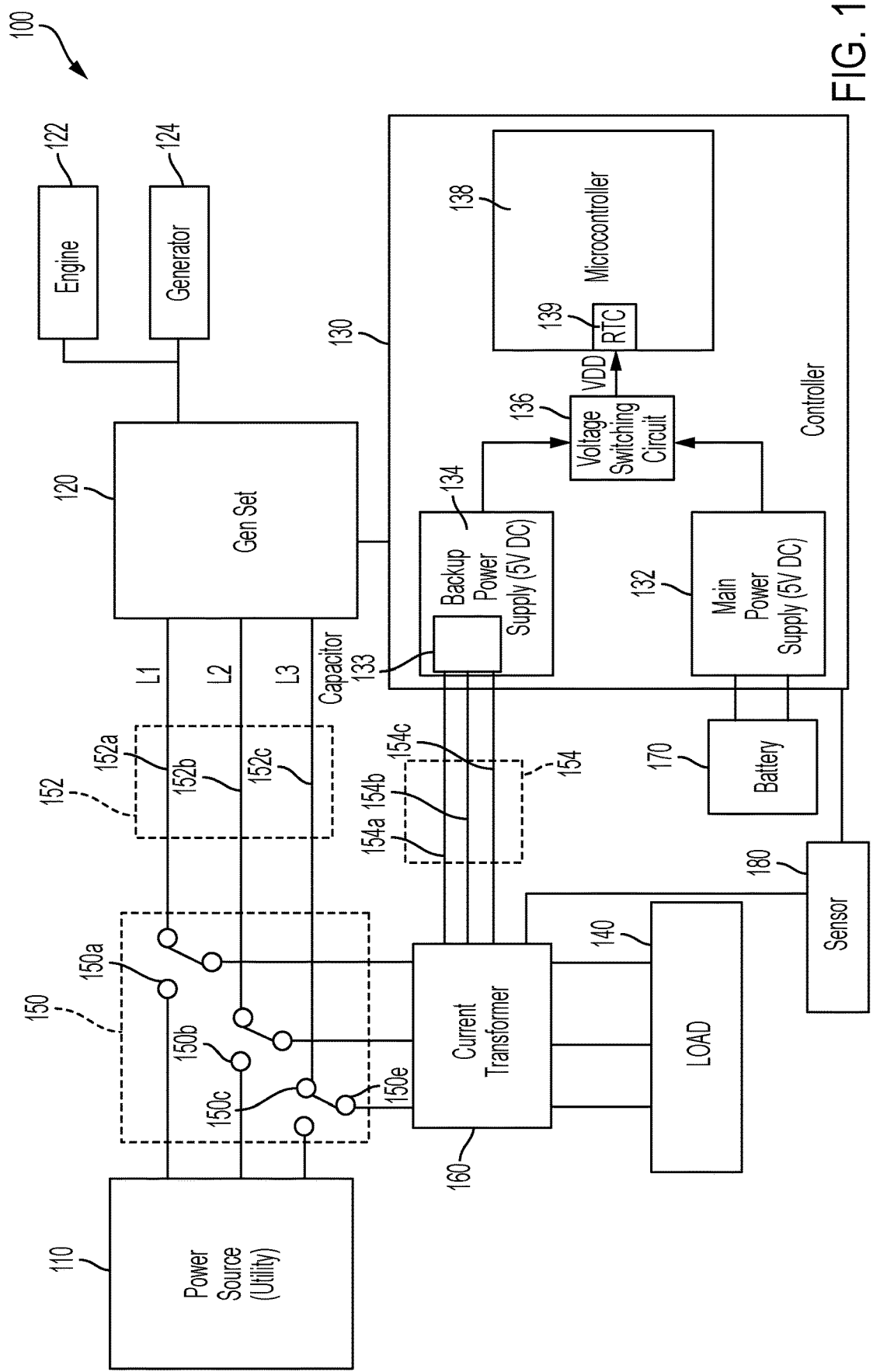
FIG. 1 is a schematic diagram of a system comprising a genset electronically coupled to a controller, according to an example embodiment.

Referring now to FIG. 1, a schematic diagram of a system 100 comprising a genset 120 coupled to a controller 130 is shown, according to an example embodiment. As shown in FIG. 1, the system 100 generally includes a power source 110, the genset 120, the controller 130, one or more of a load 140, one or more of an automatic transfer switch 150, one or more of a first conductor 152, one or more of a second conductor 154, a current transformer 160, a battery 170, and a sensor 180 coupled to one or more components of the system 100. These components are described more fully herein.

One skilled in the art will recognize that the present disclosure is applicable to a wide variety of implementations. As shown and according to an example embodiment, the power source 110 may be a utility and the system 100 may be an electrical power production system. As shown, the system 100 includes one or more loads 140. The load 140 may be an appliance, industrial machinery, an electronic device, etc. and may be structured and/or rated to consume power in the form of alternating current (AC) or direct current (DC). The power is provided, via one or more of the first conductor 152 and/or one or more of the second conductor 154, by the power source 110. In some operating states of the system 100, the power is provided, via one or more of the first conductor 152 and/or one or more of the second conductor 154, by the genset 120 (e.g., in failover mode when the power source 110 is unavailable.) In some embodiments, the power source 110 and/or the genset 120 are AC voltage generating systems. In embodiments where the load 140 is a DC load, the genset 120 may be coupled to a rectifier structured to convert alternating current to direct current.

Components of the system 100 may communicate with each other or with other components using any type and any number of wired or wireless connections. For example, a wired connection may include a serial cable, a fiber optic cable, a CAT5 cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections. Because the controller 130 is coupled to the systems and components in the system 100 of FIG. 1, the controller 130 is structured to receive data regarding one or more of the components shown in FIG. 1. For example, the data may include operational data regarding the operating conditions of the system 100. The operational data may be provided by one or more sensors, such as a sensor 180. As another example, the operational data may include an input from one or more components of the genset 120. The controller 130 may be structured to determine how to control the genset 120, the automatic transfer switch 150, the load 140, etc. according to external user input provided via an input/output interface associated with the respective subsystem and/or according to the operational data acquired during the operation of any of the components of the system 100.

In the embodiment of FIG. 1, the power source 110 is an entity (e.g., a network of electrical components) configured to supply and/or transfer electric power. For example, the power source 110 may comprise or be part of an electric power system, an electrical grid, a power generating system, a power station, a power distribution system/substation, etc. In the example embodiment, the power source 110 is a utility, providing power for commercial or residential applications. The power source 110 may be an aggregation of machinery for converting latent energy (e.g., of a combustible) or potential energy (e.g., of water) into electrical energy. The power source 110 may generate and/or receive its power in various ways, including, for example, nuclear, fossil fuel (coal, natural gas, etc.), geothermal, hydroelectric, wind, solar, etc.

The genset 120 provides back-up power in the event the power source 110 is unavailable or when a capacity of the power source 110 decreases below a pre-determined capacity threshold. In an example embodiment, the genset 120 includes an engine 122 coupled to a generator 124, which produces energy when driven by the engine 122. The engine 122 may be configured to provide mechanical power to the generator 124. The engine 122 may include an internal combustion)"IC" (engine which converts fuel (e.g., diesel, gasoline, natural gas, biodiesel, ethanol, liquid petroleum gas or any combination thereof) into mechanical energy. The engine 122 may include a plurality of piston and cylinder pairs for combusting the fuel to produce mechanical energy. In some embodiments, the engine 122 is a spark ignition engine. In some embodiments, the engine 122 is a compression ignition engine.

The engine 122 may be coupled to the generator 124 via a shaft so as to provide mechanical power thereto in response to the load demand exerted on the engine by the generator 124. The generator 124 may include an alternator, for example a wound rotor or permanent magnet alternator configured to convert a rotational mechanical power produced by the engine 122 into electrical energy. The generator 124 is configured to produce an electrical output. The electrical output can include a voltage and/or a current, and is proportional to the speed or torque provided by the engine 122 to the generator 124. The generator 124 is configured to exert a load demand on the engine 122, for example based on a load demand (e.g., power, speed, torque, etc.) demanded by the load 140 from the generator 124.

As shown in the embodiment of FIG. 1, the engine 122 and/or the generator 124 of the genset 120 are coupled to the controller 130 (e.g., control system, control unit, etc.), which, according to various embodiments and as described further herein, may be structured to operate as an automatic transfer switch controller, a load management controller, an alternating current (AC) distribution controller, etc. for the genset 120. The controller 130 may comprise various circuits and, in the example shown, a microcontroller 138. According to an alternate embodiment, the microcontroller 138 is separate from the controller 130 such that the controller 130 is communicatively coupled to the microcontroller 138. The controller 130 and/or the microcontroller 138 may comprise control circuitry for managing various components of the system 100, such as data management functions and/or operation control functions, data saves, etc. The controller 130 and/or the microcontroller 138 may comprise a clock 139 (in the example architecture shown, the microcontroller 138 comprises the clock 139). In some embodiments, the clock 139 is an integrated circuit structured to keep time. In some embodiments, the clock 139 comprises read/write registers, each register associated with a unique physical address or multiple unique physical addresses and used, respectively, to track units of time (e.g., microseconds, milliseconds, seconds, minutes, hours, days, dates, months, years etc.) and/or to track clock control functions (12-hour mode, 24-hour mode, etc.) In some embodiments, the clock 139 is a real-time clock (RTC).

As shown, the controller 130 is coupled to the main power supply 132 and the back-up power supply 134, each structured to provide power to the microcontroller 138 and/or the clock 139. As shown, the microcontroller 138 and/or the clock 139 can be powered from the main power supply 132 and/or the back-up power supply 134. The main power supply 132 comprises an energy storage device, such as a portable energy storage device (e.g., a battery 170). The battery 170 may be a lithium-ion battery, a lithium-air battery, a lithium-sulfur battery, etc. The back-up power supply 134 is an energy storage device that may comprise or be coupled to a capacitor 133. In some embodiments, the power supply 134 is a portable energy storage device. In some embodiments, the back-up power supply comprises one or more of the capacitor 133. For example, the power supply 134 can be a capacitor bank comprising a plurality of capacitors 133. The capacitor bank may be disposed or otherwise coupled to a power circuit board (PCB). In some embodiments, the main power supply 132 and/or the back-up power supply 134 is a 5V DC device. The controller 130 comprises and/or is coupled to a voltage switching circuit 136, which is structured to convert the output voltage (e.g., 5V DC) of either the main power supply 132 or the back-up power supply 134 comprising the capacitor 133 to the circuit supply voltage (e.g., 3.3V) to power various electronic components, such as the microcontroller 138 of FIG. 1, clock 139 of FIG. 1, etc. When the main power supply 132 fails, is taken offline and/or otherwise ceases providing power (e.g., to the controller 130, microcontroller 138, clock 139), the controller 130 is structured to switch to the back-up power supply 134. The back-up power supply 134 draws power from the capacitor 133, which is used to harvest and accumulate energy from the current output of the current transformer 160.

Each of the power source 110 and genset 120 is electrically coupled to the current transformer 160 via one or more of a first conductor 152 and/or one or more of the second conductor 154. The one or more of the first conductor 152 and/or one or more of the second conductor 154 may be structured to carry electricity from the power source 110 and/or genset 120, via the current transformer 160, to one or more of the load 140. The one or more of the first conductor 152 and/or one or more of the second conductor 154 may comprise copper, aluminum, etc. supported on an insulator, such as glass, porcelain, polymer, etc. In some embodiments, the one or more of the first conductor 152 and/or one or more of the second conductor 154 comprises a high-temperature superconductor (HTS), such as a compound of copper and oxygen, an iron-based compound, a hydrogen sulfide, etc.

The current transformer 160 is structured to measure (in some embodiments, determine based on operating parameters of the system) alternating current (AC) to aid in monitoring operations of the system 100, including operations of the power source 110 and/or operations of the genset 120. The current transformer 160 provides a current signal, via one or more of the second conductor 154, to an energy storage device such as, in the example embodiment of FIG. 1, capacitor 133 of the back-up power supply 134. In some embodiments, the current transformer 160 is structured to provide, to the capacitor 133, output current at a rate of flow of up to and including 500 milliamps. In some embodiments, the current transformer 160 is structured to provide output current at a rate of flow of approximately 100 milliamps.

The capacitor 133 is an energy storage device capable of accumulating energy used to power various components of the controller 130, such as the microcontroller 138 and/or the clock 139. The capacitor 133 is electrically coupled to the back-up power supply 134 of the controller 130. In some embodiments, the back-up power supply comprises the capacitor 133.

According to various implementations, the controller 130 and/or the microcontroller 138 may be an automatic transfer switch controller, a load management controller, an alternating current (AC) distribution controller, etc. In some implementations, the controller 130 controls some or more of the operations of the components in the genset 120 (e.g., the engine 122). The controller 130 may comprise one or more memory modules and circuits structured to perform operations (such as, for example, retrieving data, saving data, etc.) as described further herein. In some embodiments and as shown and described above, the controller 130 comprises the microcontroller 138 (and in certain embodiments, may comprise more than one microcontroller). As described above, the microcontroller 138 may comprise the clock 139; in other embodiments, the clock 139 may be separate from the microcontroller 138 such that the microcontroller 138 may be communicatively coupled to the clock 139 via a chipset (e.g., via a serial peripheral interface (SPI), inter-integrated circuit (I2C), etc.)

In the embodiment of FIG. 1, the controller 130 comprises automatic transfer switch controller functions. The controller 130 is coupled to and controls the operation of one or more of the automatic transfer switch 150 as part of a failover process between the power source 110 and the genset 120. One or more of an automatic transfer switch 150 are coupled to each of the power source 110 and genset 120. The one or more of an automatic transfer switch 150 is configured to switch a load, such as the load 140, between the power source 110 and the genset 120 so that the genset 120 may provide temporary electrical power when the power source 110 fails or is otherwise unavailable. The one or more of an automatic transfer switch 150 may be an open-transition, a closed-transition, a tri-phase (both sources off), and/or a programmed conditional transfer switch. In some embodiments, the controller 130 is configured to briefly connect the power source 110 and the genset 120, via the automatic transfer switch 150, for up to 100 msec. In some embodiments, the controller 130 is configured to provide a soft load (ramping) closed transition. According to various implementations, the amperage of the automatic transfer switch 150 (e.g., the amp rating) may vary. In an example embodiment, the amp rating of the automatic transfer switch 150 is up to and inclusive of 1,000 amps. In some embodiments, the amperage of the automatic transfer switch 150 may vary based, for example, on the load rating of the generator 124 of the genset 120. According to various embodiments, the automatic transfer switch 150 may have an amp rating between and inclusive of 40 amps and 4,000 amps.

The controller 130 may be configured to command the engine 122 and/or the generator 124 of the genset 120 to start when a predetermined condition is detected—for example, based on the electrical output from the power source 110 and/or the genset 120 monitored using the controller 130, the current transformer 160, and/or the sensor 180. In some embodiments, the controller 130 may be configured to continuously and/or periodically (e.g., every 100 milliseconds, 1 second, 5 seconds, 30 seconds, every minute, every 5 minutes, etc.) monitor the power source 110 by, for example, determining the electrical output of the power source 110, upon detecting that the power source 110 is operational, generating and providing instructions to the engine 122 and/or the generator 124 of the genset 120 to stop operating, and activating the automatic transfer switch 150 to switch from the genset 120 to the power source 110. In some embodiments, rather than switching between a power source 110 and a genset 120, the controller 130 is structured to operate the automatic transfer switch 150 to effectuate failover from a first utility source, such as the power source 110, to another utility source.

In some embodiments, the controller 130 may be structured to facilitate electronic communications from the automatic transfer switch 150 to other transfer switches, supervisory control and data acquisition (SCADA) networked accessories, genset 120, etc. using a suitable communications protocol, such as BACNet, Modbus, LonWorks, etc. The controller 130 may be configured to collect additional information regarding the operation of the automatic transfer switch 150, such as network status, operational events, etc. In some embodiments, collection and/or storage of this additional information, such as data saves, are managed by the microcontroller 138. Advantageously, these functions are continued even while the main power supply 132 to the controller 130 is not operational.

Further with respect to FIG. 1, the system 100 comprises one or more of the sensor 180. The sensor 180 is coupled to one or more components of the system 100. The sensor 180 may be structured to monitor the operating characteristics of various components of the system 100. By way of example, the sensor 180 may facilitate the monitoring of operating conditions of the load 140, current transformer 160, etc. In some embodiments, the sensor 180 is a power sensor, a voltage sensor, etc. In some embodiments, the sensor 180 is a power sensor used to determine (sense) the electrical output (e.g., current, voltage) flowing to the back-up power supply 134. In some embodiments, the sensor 180 comprises one or more resistors used (e.g., by the voltage switching circuit 136 of the controller 130) to determine output voltage from the main power supply 132 and/or the back-up power supply 134 to the clock 139 and/or the microcontroller 138.

Figure 2:
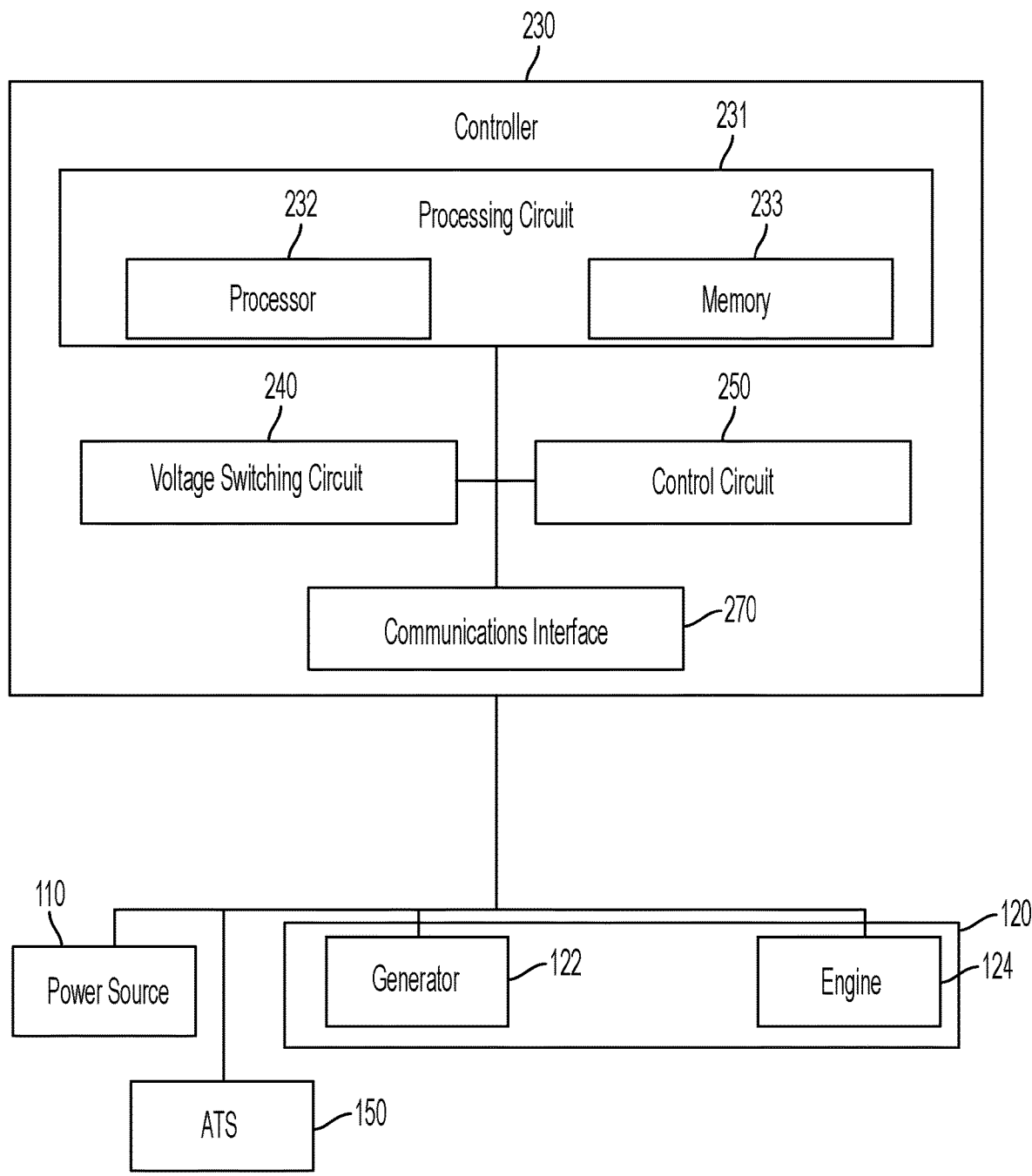
FIG. 2 is a schematic diagram of the controller of the system of FIG. 1, according to an example embodiment.

Referring now to FIG. 2, a schematic diagram shows the controller 130 (here, shown in an example embodiment as a controller 230) of the system 100 of FIG. 1. As shown in FIG. 2, the controller 130 includes a processing circuit 231 comprising a processor 232 and a memory 233; a voltage switching circuit 240; a control circuit 250; and a communications interface 270. As described herein, the controller 230 may be structured to manage the provision of back-up power for the microcontroller 138 and/or the clock 139 shown in FIG. 1.

In one configuration, the voltage switching circuit 240, the control circuit 250, and/or the communications interface 270 are embodied as machine or computer-readable media that is executable by a processor, such as the processor 232. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). Thus, the computer readable media may include code, which may be written in any programming language including, but not limited to, Java or the like and any conventional procedural programming languages, such as the "C" programming language or similar programming languages. The computer readable program code may be executed on one processor 232 or one or more remote processors. In the latter scenario, the remote processors may be connected to each other through any type of network (e.g., CAN bus, etc.).

In another configuration the voltage switching circuit 240, the control circuit 250, and/or the communications interface 270 are embodied as hardware units, such as electronic control units. As such, the voltage switching circuit 240, the control circuit 250, and/or the communications interface 270 may be embodied as one or more circuitry components including, but not limited to, processing circuitry, network interfaces, peripheral devices, input devices, output devices, sensors, etc. In some embodiments, the voltage switching circuit 240, the control circuit 250, and/or the communications interface 270 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the voltage switching circuit 240, the control circuit 250, and/or the communications interface 270 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on. Thus, the voltage switching circuit 240, the control circuit 250, and/or the communications interface 270 may also include programmable hardware devices such as field programmable gate arrays, programmable array logic, programmable logic devices or the like. In this regard, the voltage switching circuit 240, the control circuit 250, and/or the communications interface 270 may include one or more memory devices for storing instructions that are executable by the processor(s) of the voltage switching circuit 240, the control circuit 250, and/or the communications interface 270. The one or more memory devices and processor(s) may have the same definition as provided below with respect to the memory 233 and the processor 232. Thus, in this hardware unit configuration, the voltage switching circuit 240, the control circuit 250, and/or the communications interface 270 may be geographically dispersed throughout separate locations in the system 100 (e.g., separate control units, etc.). Alternatively, and as shown the voltage switching circuit 240, the control circuit 250, and/or the communications interface 270 may be embodied in or within a single unit/housing, which is shown as the controller 230.

In the example shown, the controller 230 includes the processing circuit 231 having the processor 232 and the memory 233. The processing circuit 231 may be structured or configured to execute or implement the instructions, commands, and/or control processes described herein with respect to voltage switching circuit 240, control circuit 250, and/or communications interface 270. Thus, the depicted configuration represents the aforementioned arrangement where the voltage switching circuit 240, the control circuit 250, and/or the communications interface 270 are embodied as machine or computer-readable media. However, as mentioned above, this illustration is not meant to be limiting as the present disclosure contemplates other embodiments such as the aforementioned embodiment where the voltage switching circuit 240, the control circuit 250, and/or the communications interface 270 are configured as a hardware unit. All such combinations and variations are intended to fall within the scope of the present disclosure.

The processor 232 may be implemented as one or more general-purpose processors, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the voltage switching circuit 240, the control circuit 250, and/or the communications interface 270 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory 233 (e.g., RAM, ROM, Flash Memory, hard disk storage, etc.) may store data and/or computer code for facilitating the various processes described herein. The memory 233 may be connected to the processor 232 to provide computer code or instructions to the processor 232 for executing at least some of the processes described herein. Moreover, the memory 233 may be or include tangible, non-transient volatile memory or non-volatile memory. Accordingly, the memory 233 may include database components, object code components, script components, or any other type of information structure for supporting the various activities and information structures described herein.

The communications interface 270 may include wired or wireless interfaces (e.g., jacks, antennas, transmitters, receivers, transceivers, wire terminals, etc.) for conducting data communications with various systems, devices, or networks. For example, the communications interface 270 may include an Ethernet card and port for sending and receiving data via an Ethernet-based communications network and/or a Wi-Fi transceiver for communicating via a wireless communications network. The communications interface 270 may be structured to communicate via local area networks or wide area networks (e.g., the Internet, etc.) and may use a variety of communications protocols (e.g., IP, local operating network (LON), controller area network (CAN), J1939, local interconnect network (LIN), Bluetooth, ZigBee, radio, cellular, near field communication, etc.).

The communications interface 270 of the controller 230 may facilitate communication between and among the controller 230 and one or more components of the system 100 of FIG. 1 (as shown, the power source 110, genset 120, and/or the automatic transfer switch 150). Communication between and among the controller 230 and the components of the system 100 may be via any number of wired or wireless connections (e.g., any standard under IEEE 802, etc.). For example, a wired connection may include a serial cable, a fiber optic cable, a CAT5 cable, or any other form of wired connection. In comparison, a wireless connection may include the Internet, Wi-Fi, cellular, Bluetooth, ZigBee, radio, etc. In one embodiment, a CAN bus provides the exchange of signals, information, and/or data. The CAN bus can include any number of wired and wireless connections that provide the exchange of signals, information, and/or data. The CAN bus may communicate (for example, through a CAN bus adapter) with a local area network (LAN), or a wide area network (WAN), or a connection may be made to an external computer (for example, through the Internet using an Internet Service Provider).

The voltage switching circuit 240 is structured to convert the output voltage (e.g., 5V DC) of either the main power supply 132 or the back-up power supply 134 comprising the capacitor 133 to the circuit supply voltage (e.g., 3.3V) to power various electronic components, such as the microcontroller 138 of FIG. 1, clock 139 of FIG. 1, etc. The voltage switching circuit may comprise various electronic components structured to regulate output voltage level, such as one or more resistors, voltage regulators, etc. The voltage switching circuit 240 is structured to be power source agnostic. In an example embodiment, the voltage switching circuit is structured to be in an active operational state throughout the duration of the up-time of the system 100 of FIG. 1 such that the output voltage of any power supply for the microcontroller 138 and/or clock 139 (e.g., of the main power supply 132 or the back-up power supply 134) is converted to circuit supply voltage (e.g., 3.3V) to support the functions of the microcontroller 138 and/or clock 139.

Figure 3:
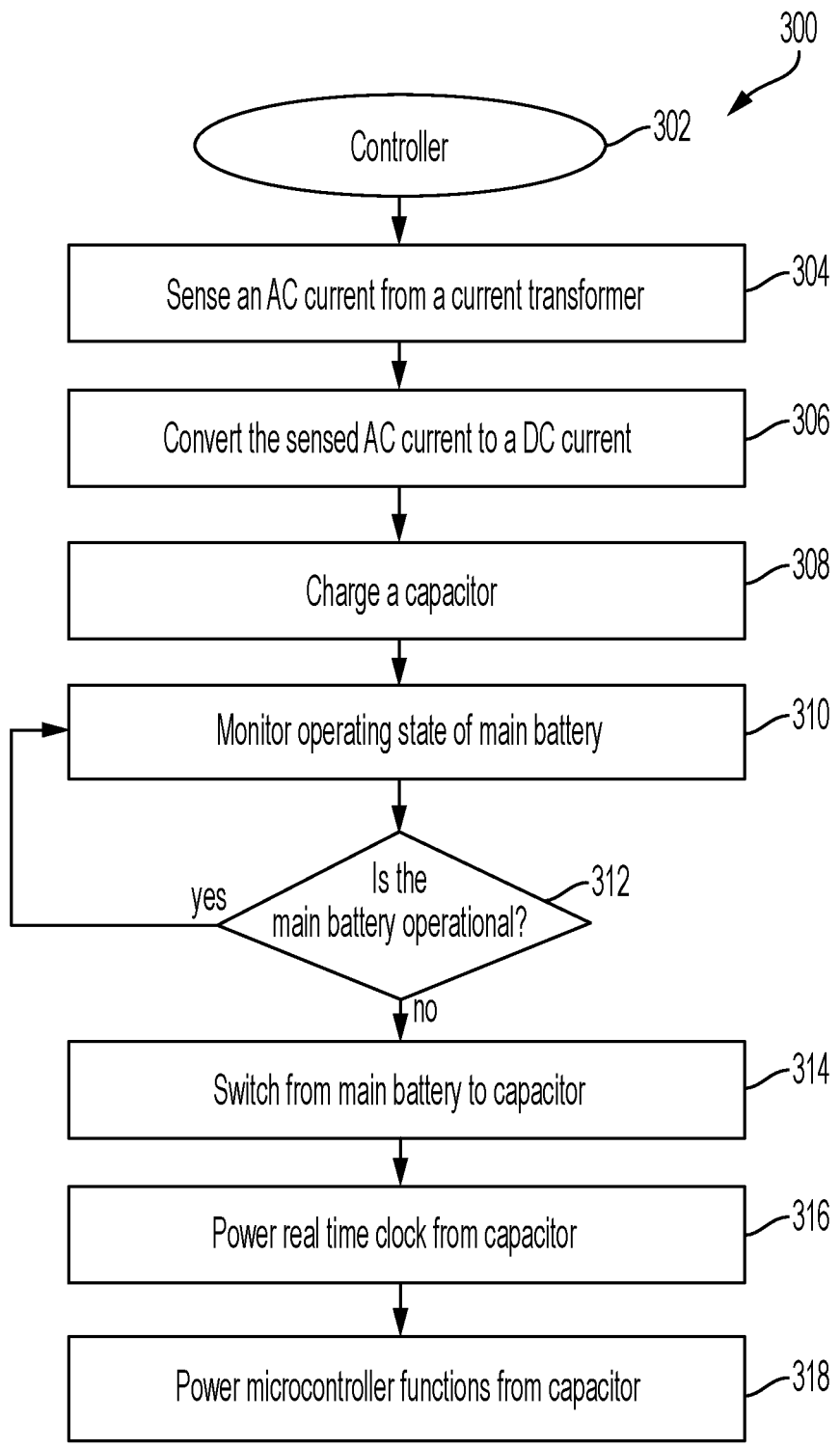
FIG. 3 is a flow diagram of a method, performed by the controller of the system of FIG. 1, for back-up power supply generation for clock and microcontroller functions, according to an example embodiment.

The control circuit 250 is structured to execute the processes and operations associated with back-up power supply generation for clock and microcontroller functions, including critical data saves. In an example embodiment, the control circuit 250 is structured to manage the processes of sensing an AC (alternating current) from the current transformer 160, converting the sensed AC to DC (direct current), charging the capacitor 133 of the back-up power supply 134 to a predetermined value (e.g., 5V DC), determining whether the battery 170 is offline, upon determining that the battery 170 is offline, switching to the back-up power supply 134, powering the microcontroller 138, powering the clock 139, etc. In some embodiments, the control circuit 250 comprises one or more electronic circuits, such as an electronic circuit 400 of FIG. 4, which is structured to charge a capacitor, and/or a control circuit 506 of FIG. 5, structured to carry out the operations associated with switching from the primary power supply to the secondary power supply, as shown in greater detail in FIG. 6. In one example embodiment, the control circuit 250 is structured to manage and/or perform the operations of the method 300 for back-up power supply generation, which is described further herein with reference to FIG. 3. Referring now to FIG. 3, a flow diagram of a method 300, performed by the controller 130 of the system of FIG. 1 (also shown, in an example embodiment, as controller 230 of FIG. 2), for back-up power supply generation for clock and microcontroller functions, according to an example embodiment. The operations and processes of method 300 may be performed by the voltage switching circuit 240 and/or the control circuit 250 of the controller 230. As such, method 300 may be described with respect to FIGS. 1 and 2 such that the controller 302, structured to perform the operations and processes of the method 300, may comprise some or all components of the controller 130 of FIG. 1 and/or the controller 230 of FIG. 2 and may be coupled to the various components shown in FIG. 1 or 2, such as the main power supply 132, the back-up power supply 134, one or more of the automatic transfer switch 150, the current transformer 160, etc.

At process 304, controller 302 (e.g., controller 130 of FIG. 1 or controller 230 of FIG. 2) is structured to receive information indicative of a sensed AC amount from a current transformer, such as the current transformer 160 of FIG. 1. In some embodiments, the current transformer 160 is structured to provide output AC at a rate of flow of up to and including 500 milliamps. In some embodiments, the current transformer 160 is structured to provide output AC at a rate of flow of approximately 100 milliamps. More specifically, in some embodiments, the arrangements of FIG. 1 and FIG. 3 can include a step-down current transformer, such that the current transformer 160 of FIG. 1 In some embodiments, the current rating of the genset 120 can be around 100 Amp per phase, and the rating of the current transformer 160 can be chosen to be 100:1 Amp, 100:5 Amp, etc. As the primary current for the current transformer 160 (e.g., current of the load 140) increases or decreases, the secondary current of the current transformer 160 correspondingly increases or decreases. The primary current is the current that flows through the primary winding of the current transformer 160, and the secondary current is the current that flows through a secondary winding of the current transformer 160. In one example, where the current transformer 160 is rated 100:1 Amp and the load current is 50 Amp, the secondary current is 0.5 Amp.

In some embodiments, controller 302 is coupled to the sensor 180 of FIG. 1. The sensor 180 is structured to provide data regarding the output AC of the current transformer 160. The controller 302 is structured to receive, interpret, and/or store in permanent or transitory or non-transitory memory, such as the memory 233 of FIG. 2, the output value(s) provided by the sensor 180. For example, the sensor 180 may be structured to determine and provide the rate of flow, magnitude, etc. regarding the output AC of the current transformer 160.

At process 306, controller 302 is structured to convert the sensed AC to a DC. In an example embodiment, controller 302 comprises one or more rectifier circuits (such as those comprising the diodes of FIG. 4), which may include one or more diodes structured to control the direction of current flow from the current transformer 160 of FIG. 1 to the capacitor 133 of the back-up power supply 134 of FIG. 1.

At process 308, controller 302 is structured to charge a capacitor, such as the capacitor 133 of the back-up power supply 134 of FIG. 1, using the sensed current converted to DC. One or more circuits of the controller 302 may include a control structure, such as one embodied in the electronic circuit 400 of FIG. 4, which may be configured to allow the capacitor 133 to charge to a predetermined value (e.g., 5V).

At process 310, controller 302 is structured to continuously or periodically monitor the operating state of the main battery, such as the battery 170 of FIG. 1. In some embodiments, the controller 304 is structured to monitor the operating state of the main power supply 132 of FIG. 2. If it is determined, at the decisional 312, that the battery 170 and/or the main power supply 132 is not operational (e.g., the battery 170 and/or the main power supply 132 are offline), then the controller 302 is structured, at process 314, to switch from the main battery 170 and/or the main power supply 132 to the back-up power supply 1334 of FIG. 1. As shown, the back-up power supply 134 comprises the capacitor 133 and is structured to provide output 5V DC. The voltage switching circuit of FIG. 1 is structured to convert the output voltage (e.g., 5V DC) of the back-up power supply 134 to the circuit supply voltage (e.g., 3.3V) to power the microcontroller 138 of FIG. 1, clock 139 of FIG. 1, etc.

At process 316, controller 302 is structured to power a clock, such as the clock 139 of FIG. 1, using the converted output voltage (e.g., the output of the operations executed by the voltage switching circuit 136 of FIG. 1) of the capacitor 133 in the back-up power supply 134 of FIG. 1. In an example embodiment, the converted output voltage is 3.3V.

At process 318, controller 302 is structured to power a clock and/or the microcontroller 138 of FIG. 1, at the converted output voltage level of the capacitor 133 in the back-up power supply 134 of FIG. 1. In an example embodiment, the converted output voltage is 3.3V.

Figure 4:
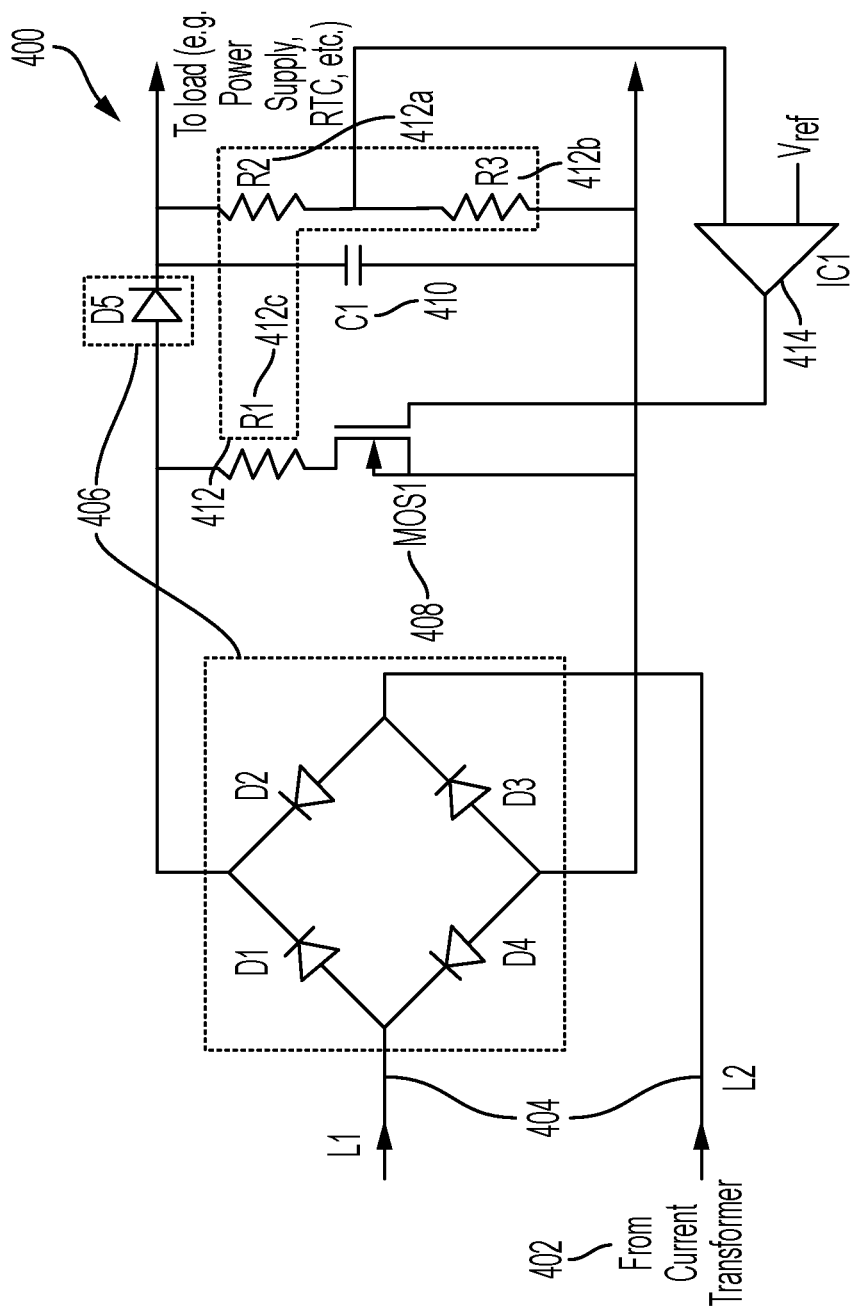
FIG. 4 is a circuit diagram of an electronic circuit for charging a capacitor and voltage switching in the system of FIG. 1, according to an example embodiment.

Referring now to FIG. 4, a circuit diagram of an electronic circuit 400 for back-up power supply generation for clock and microcontroller functions is shown, according to an example embodiment. As shown, the electronic circuit 400 is structured to charge a capacitor, such as the capacitor 133 of the back-up power supply 134 of the system 100 of FIG. 1. As shown, the electronic circuit 400 is also structured to convert the output voltage (e.g., 5V DC) of the back-up power supply 134 comprising the capacitor 133 to the circuit supply voltage (e.g., 3.3V) to power the microcontroller 138 of FIG. 1, clock 139 of FIG. 1, etc. The structure and operations of the electronic circuit 400 are described herein with respect to FIGS. 1-3 of the present disclosure. In the example embodiment, some of the components of the electronic circuit 400 are structured to implement the processes and operations of the components depicted in FIGS. 1-3.

According to various embodiments, the electronic circuit 400 may comprise one or more inductors 404, one or more diodes 406, one or more metal-oxide semiconductors (MOS) 408, one or more capacitors 410, and one or more resistors 412. As shown according to an example embodiment, the electronic circuit 400 comprises a plurality of inductors (such as L1 and L2 of the inductor 404, respectively, wherein L1 and L2 are structured to carry the load current for one or more loads 140 via the current transformer 160 of FIG. 1), a plurality of diodes (such as diodes D1-D5 of the diode 406), an MOS 408, a capacitor 410, and a plurality of resistors (such as resistors R1-R3 of the resistor 412.)

In some embodiments, the current transformer 160 of FIG. 1 is structured to provide output AC at a rate of flow of up to and including 500 milliamps. In some embodiments, the current transformer 160 is structured to provide output AC at a rate of flow of approximately 100 milliamps. Electrical current from the current transformer 160 of FIG. 1 is delivered to the MOS 408 via one or more of the inductor 404. The diodes D1-D4 are structured to control the direction of the current flow, via one or more of the inductor 404, from the current transformer 160 of FIG. 1 to the MOS 408. Together, the one or more of the inductor 404 and the diodes D1-D4 are structured to implement, according to an example embodiment, the operations of the process 304-306 of FIG. 3, wherein AC is sensed and the sensed AC from the current transformer 160 of FIG. 1 is converted, via the diodes D1-D4, to a DC. According to various embodiments, the AC may be converted to DC using any suitable arrangement of diodes, such as a diode bridge, a rectifier, etc.

As shown, the MOS 408, the resistors R1-R3 and the diode D5 are structured to implement, according to an example embodiment, the operations of the process 308 of FIG. 3 and/or the operations of the voltage switching circuit 136 of FIG. 1. The capacitor 410 (e.g., capacitor 133 of FIG. 1) is charged using the DC delivered from the current transformer 160 of FIG. 1 via the diodes D1-D4 through one or more of the inductor 404. The MOS 408 is structured to allow the capacitor 410 to charge to a predetermined voltage level, such as 5V. In an example embodiment, the MOS 408 comprises one or more transistors. The one or more transistors implement one or more gates structured to periodically open when the voltage level of the capacitor 410 is detected to be less than 5V. The one or more gates are structured to periodically close when the voltage level of the capacitor 410 is detected to be equal to 5V. In some embodiments, a sensor, such as the sensor 180 of FIG. 1, is structured to determine the voltage level of the capacitor 410. In some embodiments, the sensor is structured to make this determination at periodic intervals, e.g., every 100 milliseconds, 1 second, 5 seconds, 30 seconds, every minute, every 5 minutes, etc. Advantageously, according to this example embodiment, the 5V charge of the capacitor 410 is maintained such that power can be drawn from the capacitor 410 (e.g., the capacitor 133 of the back-up power supply 134 of FIG. 1) on an ongoing basis for the microcontroller 138 and the clock 139 of FIG. 1.

The resistors R2 and R3 control the output voltage of the capacitor 410 and implement, in the example embodiment, the operations of the voltage switching circuit 136 of FIG. 1. In an example embodiment, the capacitor 410 is structured to provide output 5V DC. The resistors R1, R2 and R3 are structured to limit the flow of electrons and set the output voltage (e.g., 5V DC) of the capacitor 410 to the circuit supply voltage to power the microcontroller 138 of FIG. 1, clock 139 of FIG. 1, etc. The circuit supply voltage can be 1.8V, 3.3V or another voltage level appropriate for the microcontroller and for its components, such as volatile memory, non-volatile memory, etc.

To illustrate the operations of the arrangement of FIG. 4, in an example embodiment, alternating current sensed by the current transformer 160 of FIG. 1 is rectified, at 402, by a diode bridge comprising diodes D1-D4 and thus converted from AC to DC. The DC charges the capacitor 410 (e.g., capacitor 133 of FIG. 1). The voltage levels for the circuit supply voltage are preset to a level defined by Vref at 414. If the capacitor charge is more than the expected pre-set voltage (e.g., 5V), the MOS 408 will be turned on (the "on" state) to reduce the charging current for the capacitor 410. If the capacitor voltage drops from the expected set voltage (e.g. 5V DC), then MOS 408 is turned off (the "off" state) and the capacitor charging current is increased to make DC voltage across it equal to the pre-set voltage (e.g. 5V). The average voltage over a period of time (such as 1 sec, 5 sec, 60 sec, etc.) across the capacitor 410 is therefore equal or approximately equal to the pre-set voltage (e.g., 5V). In some embodiments, the actual voltage over the period of time is within 1% of the pre-set voltage.

Figure 5:
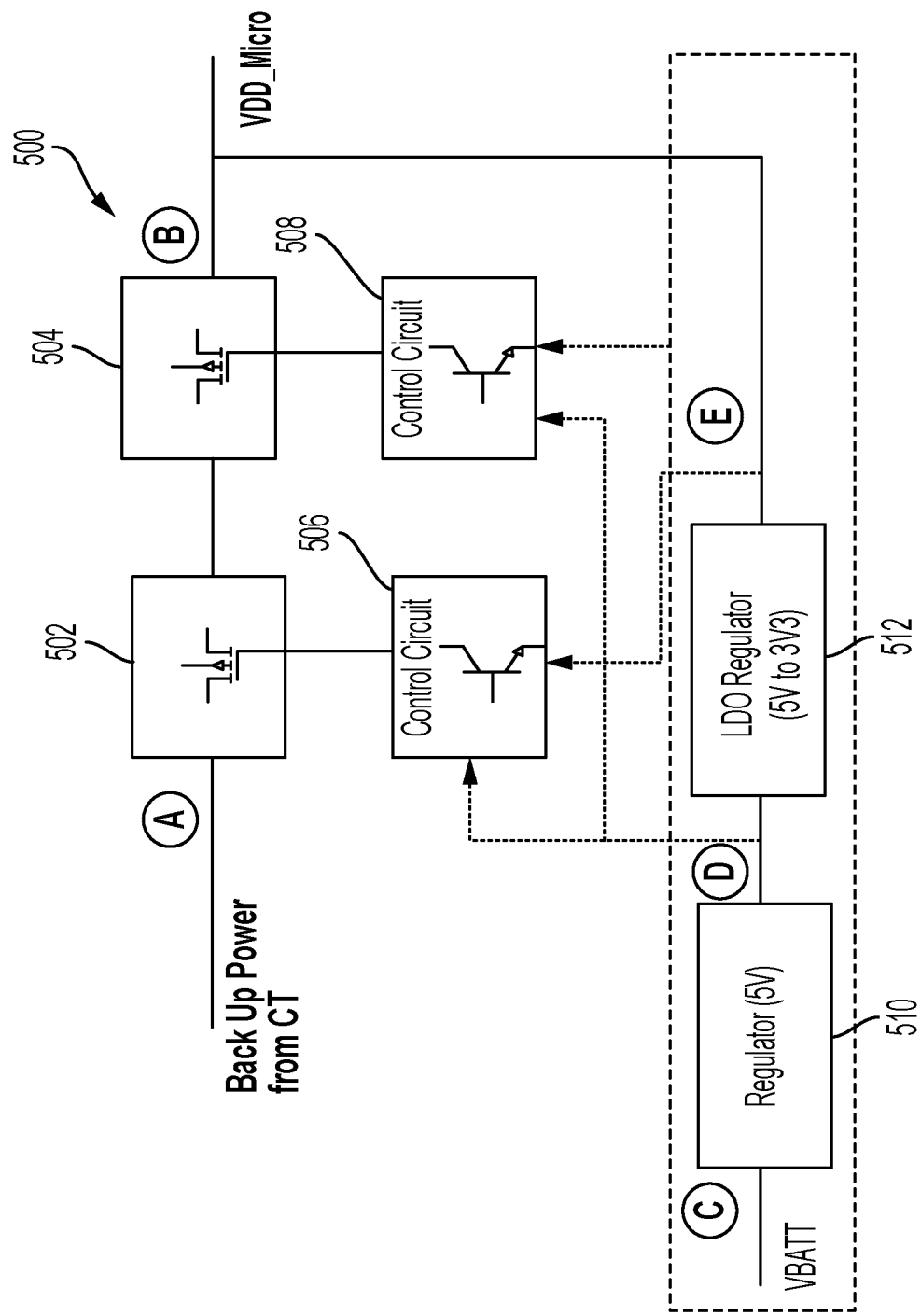
FIG. 5 is a schematic diagram of a power supply switching arrangement of the system of FIG. 1, according to an example embodiment.

Referring now to FIG. 5, a schematic diagram of a power supply switching arrangement 500 of the system of FIG. 1 is shown, according to an example embodiment. As shown, the power supply switching arrangement 500 may be structured to implement some or all of the functionality and components discussed with respect to FIGS. 1-4 and FIG. 6. For example, the power supply switching arrangement 500 may implement some or all of the functions of the controller 130 of FIG. 1, the circuits of FIG. 2 and/or FIG. 6, the processes of FIG. 3, and/or components of the electronic circuit 400 of FIG. 4.

As shown, the power supply switching arrangement 500 comprises a first MOS 502, a second MOS 504, a first control circuit 506, a second control circuit 508, a first voltage regulator 510 and a second voltage regulator 512. The first voltage regulator 510 can be coupled to the main power supply 132 and/or the back-up power supply 134 of FIG. 1. In the embodiment shown, the first voltage regulator 510 is coupled to the main power supply 132 of FIG. 1, the main power supply 132 comprising the battery 170. The second voltage regulator 512 can be coupled to or be included in the voltage switching circuit 136 of FIG. 1. When the battery 170 of FIG. 1 is not operational, as indicated by the Vbatt voltage at C, the output D of the first regulator 510 is not detectable. In other words, the first regulator 510 is not operational, which turns on the first MOS 502 through the first control circuit 506. When the low-dropout regulator (i.e. the second voltage regulator 512) is not operational as the first regulator 510 is not operational, the output E is not detectable, which turns on the second MOS 504 through the second control circuit 508. When both the first MOS 502 and the second MOS 504 are on, the back-up power supply 134 (at A) is connected to the power supply for the microcontroller 138 (at B), which supplies power to the microcontroller 138 and/or clock 139 of FIG. 1.

Figure 6:
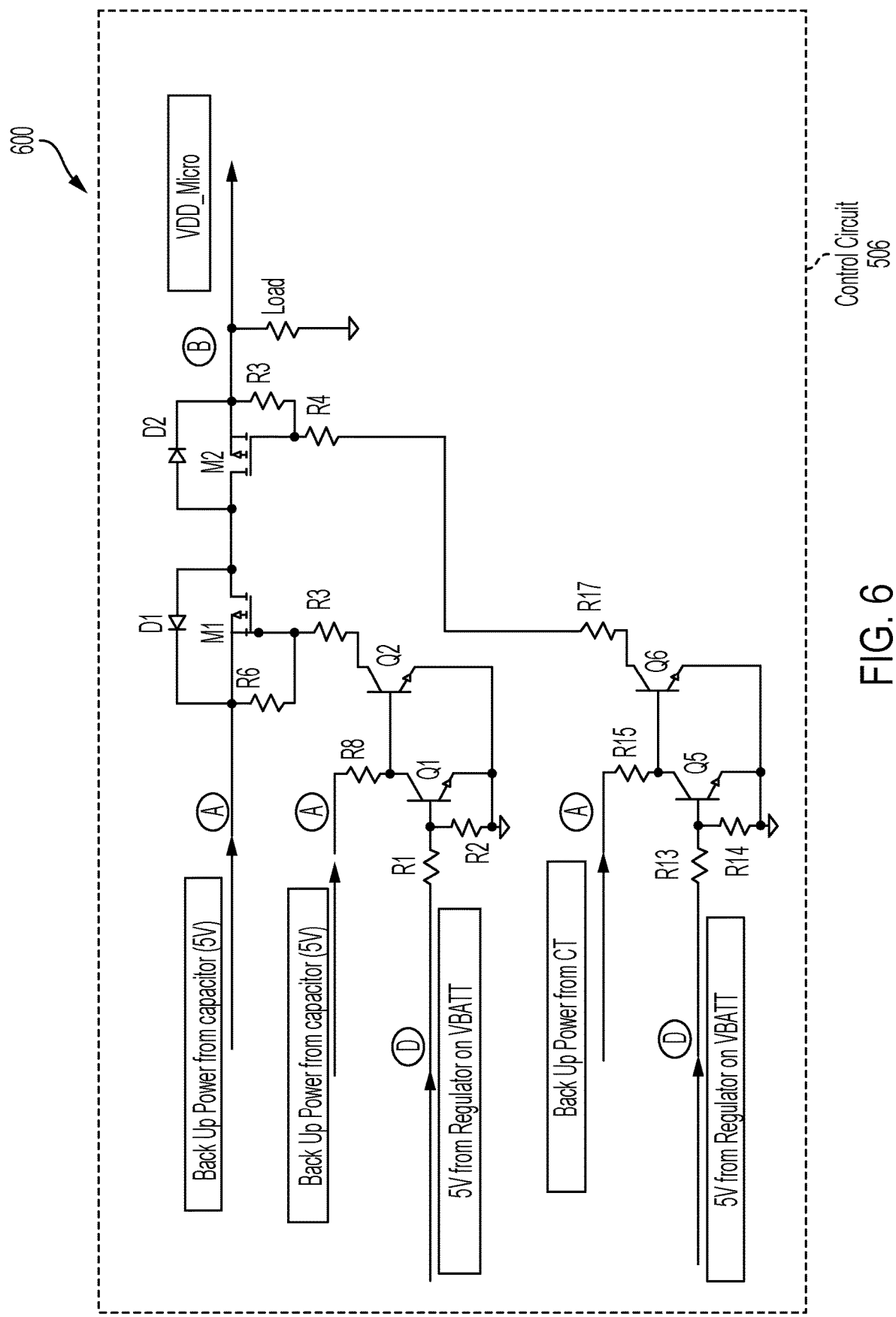
FIG. 6 is a circuit diagram of the first control circuit 506 and the second control circuit 508 of FIG. 5, according to an example embodiment.

Referring now to FIG. 6, a circuit diagram 600 for the first control circuit 506 and the second control circuit 508 of FIG. 5 is shown, according to an example embodiment. The first control circuit 506 and the second control circuit 507 are positioned downstream of the electronic circuit 400 of FIG. 4 such that, in FIG. 6, the operations of the circuit 400 are assumed to have been performed and, at point A of FIG. 6, the back-up power supply voltage from the capacitor (e.g., capacitor 410 of FIG. 4) is approximately 5V. As shown, the circuit diagram 600 includes a plurality of MOS Mn, a plurality of resistors Rn and a plurality of transistors Qn. Some or all or the transistors Qn may be bipolar junction transistors (BJT).

As shown in FIG. 5, when the battery 170 of FIG. 1 (Vbatt) is connected at point C and operational, the regulated voltage at point D (also shown as point D in FIG. 6) is 5V and the regulated voltage at point E is 3.3V. In some embodiments, the regulated voltage level is within 1% of the target value (e.g., within 1% of 5V, 3.3V, etc.) As the transistor Q1 is in the "on" state, the base bias voltage of Q2 becomes less than 0.6V and, as a result, transistor Q2 turns off (the "off" state.) As the transistor Q5 is in the "on" state, the base bias voltage of Q6 becomes less than 0.6V and, as a result, transistor Q6 turns off (the "off" state).

If the back-up power supply 134 of FIG. 1 is also connected (as shown in FIG. 6 at A), and if the transistor Q2 is in the "off" state, the MOS M1 (shown as first MOS 502 in FIG. 5) will turn off. If the transistor Q6 is in the "off" state, the MOS M2 (shown as the second MOS 504 in FIG. 6) will turn off.

As a consequence, back-up power from the power supply at point A will not be passed to the microcontroller 138 of FIG. 1 (shown as VDD Micro at point B of FIG. 6), and the output of the second voltage regulator 512 of FIG. 5 will appear at point B as 3.3V.

When main battery Vbatt (e.g., the main battery 170 of FIG. 1) is removed from its connector, the first BJT Q1 and second BJT Q5 will be turned off. In such a scenario, if the back-up power supply at point A is still connected, it will turn on BJT Q2 and the BJT Q6, which will respectively turn on the first MOS M1 (shown as first MOS 502 in FIG. 5) and the second MOS M2 (shown as second MOS 504 in FIG. 6). As a consequence, back-up power from the power supply at point A will be passed to the microcontroller 138 of FIG. 1 (shown as VDD Micro at point B of FIG. 6). In the embodiments of FIG. 5 and FIG. 6, the second MOS M2 (second MOS 504 of FIG. 5) is structured to protect the circuit when the short-to-ground or short-to-battery conditions occur.

For the purpose of this disclosure, the term "coupled" means the joining or linking of two members directly or indirectly to one another. Such joining may be stationary or moveable in nature. For example, a propeller shaft of an engine "coupled" to a transmission represents a moveable coupling. Such joining may be achieved with the two members or the two members and any additional intermediate members. For example, circuit A "coupled" to circuit B may signify that the circuit A communicates directly with circuit B (i.e., no intermediary) or communicates indirectly with circuit B (e.g., through one or more intermediaries).

While various circuits with particular functionality are shown in FIG. 1, it should be understood that the controller 130 may include any number of circuits for completing the functions described herein. Additional circuits with additional functionality may also be included. Further, it should be understood that the controller 130 may further control other activity beyond the scope of the present disclosure.

As mentioned above and in one configuration, the "circuits" may be implemented in machine-readable medium for execution by various types of processors, such as processor 232 of FIG. 2. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, it should be understood that the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally or remotely (e.g., as part of a remote server such as a cloud based server). To that end, a "circuit" as described herein may include components that are distributed across one or more locations.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. An apparatus comprising a controller, the controller comprising circuitry structured to:
   cause to provide power from a primary power supply to a microcontroller and a clock;
   sense an alternating current (AC) from a current transformer coupled to the controller;
   convert the AC, sensed from the current transformer, to direct current (rectified output DC);
   charge a capacitor to a first predetermined voltage level using the rectified output DC of the current transformer, wherein the capacitor is coupled to the controller and to a secondary power supply structured to provide power to the microcontroller and the clock when a primary power supply ceases providing power, wherein the controller comprises the microcontroller; and
   responsive to the primary power supply ceasing to provide power to the microcontroller and the clock, switch from the primary power supply to the secondary power supply; and
   cause the capacitor of the secondary power supply to provide power to the microcontroller and the clock at a second predetermined voltage level, different from the first predetermined voltage level.

2. The apparatus of claim 1, wherein the clock is a real-time clock (RTC).

3. The apparatus of claim 1, wherein the controller further comprises a voltage switching circuit, and wherein the voltage switching circuit comprises hardware circuitry structured to cause the controller to set the second predetermined voltage level.

4. The apparatus of claim 3, wherein the voltage switching circuit further comprises hardware circuitry structured to cause a voltage regulator, coupled to the microcontroller, to maintain substantially constant voltage level within 1% of the second predetermined voltage level.

5. The apparatus of claim 1, wherein the first predetermined voltage level is 5V.

6. The apparatus of claim 1, wherein the second predetermined voltage level is 3.3V.

7. The apparatus of claim 1, wherein the controller is structured to control operations of an electronic component coupled to a genset, and wherein the controller is one of an automatic transfer switch controller, a load management controller, and an AC distribution controller.

8. A system comprising:
   a microcontroller associated with a controller of a control system, the controller comprising a control circuit, wherein the microcontroller comprises a clock, wherein the clock is a real-time clock;
   a primary power supply structured to provide power to the microcontroller and the clock; and
   a secondary power supply structured to provide power to the microcontroller and the clock, the secondary power supply being coupled to a current transformer, the secondary power supply comprising a capacitor;
   wherein the control circuit is structured to:
      sense an alternating current (AC) from the current transformer;
      convert the AC, sensed from the current transformer, to direct current (rectified output DC);
      charge the capacitor to a first predetermined voltage level using the rectified output DC of the current transformer;
      responsive to the primary power supply ceasing to provide the power to the microcontroller and the clock, switch from the primary power supply to the secondary power supply; and
      cause the capacitor of the secondary power supply to provide power to the microcontroller and the clock at a second predetermined voltage level, different from the first predetermined voltage level.

9. The system of claim 8, wherein at least one of the first predetermined voltage level and the second predetermined voltage level are set by configuring hardware circuitry.

10. The system of claim 8, wherein the controller is structured to cause a voltage regulator, coupled to the controller, to maintain a constant voltage level within 1% of the second predetermined voltage level.

11. The system of claim 8, wherein the first predetermined voltage level is 5V and the second predetermined voltage level is 3.3V.

12. The system of claim 8, wherein the controller is one of an automatic transfer switch controller, a load management controller, and an AC distribution controller.

13. A method for back-up power supply generation for a microcontroller, the method comprising:
   causing to provide power from a primary power supply to the microcontroller and a clock:
   sensing, by a control circuit of a controller, an alternating current (AC) from a current transformer;
   converting the AC, sensed from the current transformer, to direct current (rectified output DC);

charging a capacitor to a first predetermined voltage level using the rectified output DC of the current transformer, wherein the capacitor is coupled to a secondary power supply structured to provide power, when a primary power supply ceases providing power, to the microcontroller and the clock; and responsive to the primary power supply ceasing to provide the power to the microcontroller and the clock, switching from the primary power supply to the secondary power supply; and causing the capacitor of the secondary power supply to provide power to the microcontroller and the clock at a second predetermined voltage level, different from the first predetermined voltage level.

14. The method of claim 13, wherein the microcontroller comprises a real-time clock, the method further comprising causing, by the control circuit, the secondary power supply to provide power to the real-time clock.

15. The method of claim 13, wherein causing the capacitor of the secondary power supply to provide power to the microcontroller at the second predetermined voltage level further comprises reaching, by a voltage switching circuit of the controller, a value within 1% of the second predetermined voltage level.

16. The method of claim 15, wherein the voltage switching circuit of the controller is coupled to a voltage regulator, the method further comprising causing, by the voltage switching circuit, the voltage regulator to maintain a substantially constant voltage level corresponding to the second predetermined voltage level.

17. The method of claim 13, wherein the first predetermined voltage level is 5V.

18. The method of claim 13, wherein the second predetermined voltage level is 3.3V.

19. The method of claim 13, wherein a rate of flow of the AC from the current transformer is between, and inclusive of, 100 milliamps and 500 milliamps.

20. The method of claim 13, wherein the controller is structured to control operations of an electronic component coupled to a genset, and wherein the controller is one of an automatic transfer switch controller, a load management controller, and an AC distribution controller.

* * * * *